(12) United States Patent
Foster et al.

(10) Patent No.: US 7,373,662 B2
(45) Date of Patent: May 13, 2008

(54) SECURE RESOURCE ACCESS

(75) Inventors: Ward Scott Foster, Boise, ID (US);
Robert John Madril, Jr., Boise, ID (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1011 days.

(21) Appl. No.: 10/229,641

(22) Filed: Aug. 27, 2002

(65) Prior Publication Data

US 2004/0073666 A1    Apr. 15, 2004

(51) Int. Cl.
G06F 13/368    (2006.01)
G06F 9/44    (2006.01)
G06F 13/38    (2006.01)

(52) U.S. Cl. .............. 726/21; 726/29; 726/28; 726/30

(58) Field of Classification Search ............... 726/1–4, 726/17, 21, 28–30
See application file for complete search history.

(56) References Cited

U.S. PATENT DOCUMENTS 6,192,405 B1 *    2/2001    Bunnell .................. 709/225

| | | | |
|---|---|---|---|
| 2001/0039565 A1 * | 11/2001 | Gupta | 709/203 |
| 2002/0053032 A1 * | 5/2002 | Dowling et al. | 713/201 |
| 2002/0066033 A1 * | 5/2002 | Dobbins et al. | 713/201 |
| 2002/0099957 A1 * | 7/2002 | Kramer et al. | 713/201 |
| 2002/0138727 A1 * | 9/2002 | Dutta et al. | 713/167 |
| 2002/0162020 A1 * | 10/2002 | Bellaton et al. | 713/201 |
| 2002/0165960 A1 * | 11/2002 | Chan | 709/225 |
| 2002/0169961 A1 * | 11/2002 | Giles et al. | 713/175 |
| 2002/0169986 A1 * | 11/2002 | Lortz | 713/201 |
| 2003/0149893 A1 * | 8/2003 | Chang et al. | 713/201 |

FOREIGN PATENT DOCUMENTS

WO    WO 01/39465 A1 *    5/2001

* cited by examiner

*Primary Examiner*—Gilberto Barrón, Jr.
*Assistant Examiner*—Venkat Perungavoor (57) ABSTRACT

A method and system for enabling a user to authorize a client, acting under the directed of a first resource, to access a second resource. Before the client accesses the second resource, client programming, that is autonomous of the first and second resources, redirects the client to an authorization service that is also autonomous of the first and second resource. The authorization service authenticates the user, identifies policy data, if any, associated with the user and the first resource, and then returns to the client an interface generated according to the identified policy data, if any, enabling the user to grant or deny authorization. Where policy data does not exist, the authorization service returns an interface to the client enabling the user to set policy data.

39 Claims, 9 Drawing Sheets

SECURE RESOURCE ACCESS

FIELD OF THE INVENTION

The present invention is directed to accessing a distributed resource. More particularly, the invention is directed to authorizing access to a distributed resource utilizing a decentralized authorization service.

BACKGROUND OF THE INVENTION

In a basic desktop computing environment, a computer, accessing data from its hard drive, performs a specified function such as word processing, displaying information on a screen, and, when requested, producing a document on a connected printer. In a distributed computing environment, the resources found in the desktop environment are spread across any number of interconnected devices. For example, a client accesses a resource over the Internet. Accessing data provided by the client or located and retrieved from another device, the resource performs specified tasks. These tasks include, among a multitude of others, manipulating the data as instructed, returning the data for use by the client, and/or sending the data to a printer for production.

The following provides a more specific example of a distributed computing system utilized to print documents. A client computer, utilizing a web browser and the Internet, accesses a web server providing a document printing resource. The web server may be running on a device connected to or networked with one or more printers. Alternatively, the web server may be embedded in the printer itself. The printing resource locates available printers and a data resource managing electronic documents. The printing service then returns to the browser a graphical interface containing user accessible controls for selecting a document from the data resource as well as controls for selecting a printer and any production options. Selections made through the interface are returned to the printing resource. Accessing the data resource, the printing resource retrieves and/or sends the selected document to the selected printer for production.

Accessing distributed resources raises a number of security considerations. Access to a resource may be limited for commercial or privacy purposes. Using the example above, a user may be a paid subscriber enabling access to the printing resource. The user may pay a flat rate or may pay for each use. For commercial security, the user may be required to present credentials such as a user name and password in order to access the printing resource. The same may be true for the data resource. However, presenting credentials to the data resource also promotes user privacy. A user may store documents on the data resource that the user desires to keep private and secure.

In the example above, a user is required to present one set of credentials to access the printing resource and a second set of credentials to access the data resource. It is often difficult for a user to keep track of more than one set of credentials. The printing and data resources are each responsible for and include programming for authenticating the credentials presented to authorize use. While this authorization programming may not be located on the same computing device as the particular resource, it is still centralized effectively operating and located on the same site. This centralized approach to authorization can lead to network communication "bottlenecks" and decreased performance. Additionally, the centralized approach creates security risks providing a single point of attack for an unscrupulous third party.

SUMMARY

Accordingly, the present invention is directed to enabling a user to authorize a client, acting under the direction of a first resource, to access a second resource. Before the client accesses the second resource, client programming that is autonomous of the first and second resources redirects the client to an authorization service that is also autonomous of the first and second resources. The authorization service authenticates the user, identifies policy data, if any, associated with the user and the first resource, and then returns to the client an interface generated according to the identified policy data, if any, enabling the user to grant or deny authorization.

DETAILED DESCRIPTION

Glossary

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client—Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning requested information, if any, back to the client. This requested information may be an electronic file such as a word processing document or spreadsheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (extensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface that may be exposed using a variety of protocols layered on top of HTTP, such as SOAP (Simple Object Access Protocol).

Interface: The junction between a user and a computer program providing commands or menus through which a user communicates with the program. The term user represents generally any individual, mechanism, or other programming desiring to communicate with the program. For example, in the client-server model defined above, the server usually generates and delivers to a client an interface for communicating with a program operating on or controlled by the server device. Where the server is a web server, the interface is a web page. The web page when displayed by the client device presents a user with controls for selecting options, issuing commands, and entering text. The controls displayed can take many forms. They may include push buttons, radio buttons, text boxes, scroll bars, or pull-down menus accessible using a keyboard and/or a pointing device such as a mouse connected to a client device. In a non-graphical environment, the controls may include command lines allowing the user to enter textual commands. Where the user is other programming, an interface may be a programmatic interface enabling the user (programming) to interact with the computer program.

Session: An instance of the operation of a program under the control of a particular user. For example, a program or application served over the Internet may be accessed by more than one user at one time. Each instance of a user accessing the program is an application session. Where such an application is accessed over the Internet, the particular session may be identified by session data contained in the URL (Uniform Resource Locator) used to access the application. Take, for example the URL www.application.com/default?123abc. The portion "www.application.com/default" identifies the application. The portion "?123abc" identifies the session.

Introduction: In distributed computing environments, a user employs a client to request access to one or more network resources. The request includes the user's credentials that are required to be verified before access to a resource is granted. It is expected that various embodiments of the present invention will provide a decentralized and autonomous system or systems for authorizing requests to access the network resource.

Although the various embodiments of the invention disclosed herein will be described with reference to the computer network 10 shown schematically in FIG. 1, the invention is not limited to use with network 10. The invention may be implemented in or used with any computer system in which it is necessary or desirable to access electronic data. The following description and the drawings illustrate only a few exemplary embodiments of the invention. Other embodiments, forms, and details may be made without departing from the spirit and scope of the invention, which is expressed in the claims that follow this description.

Figure 1:
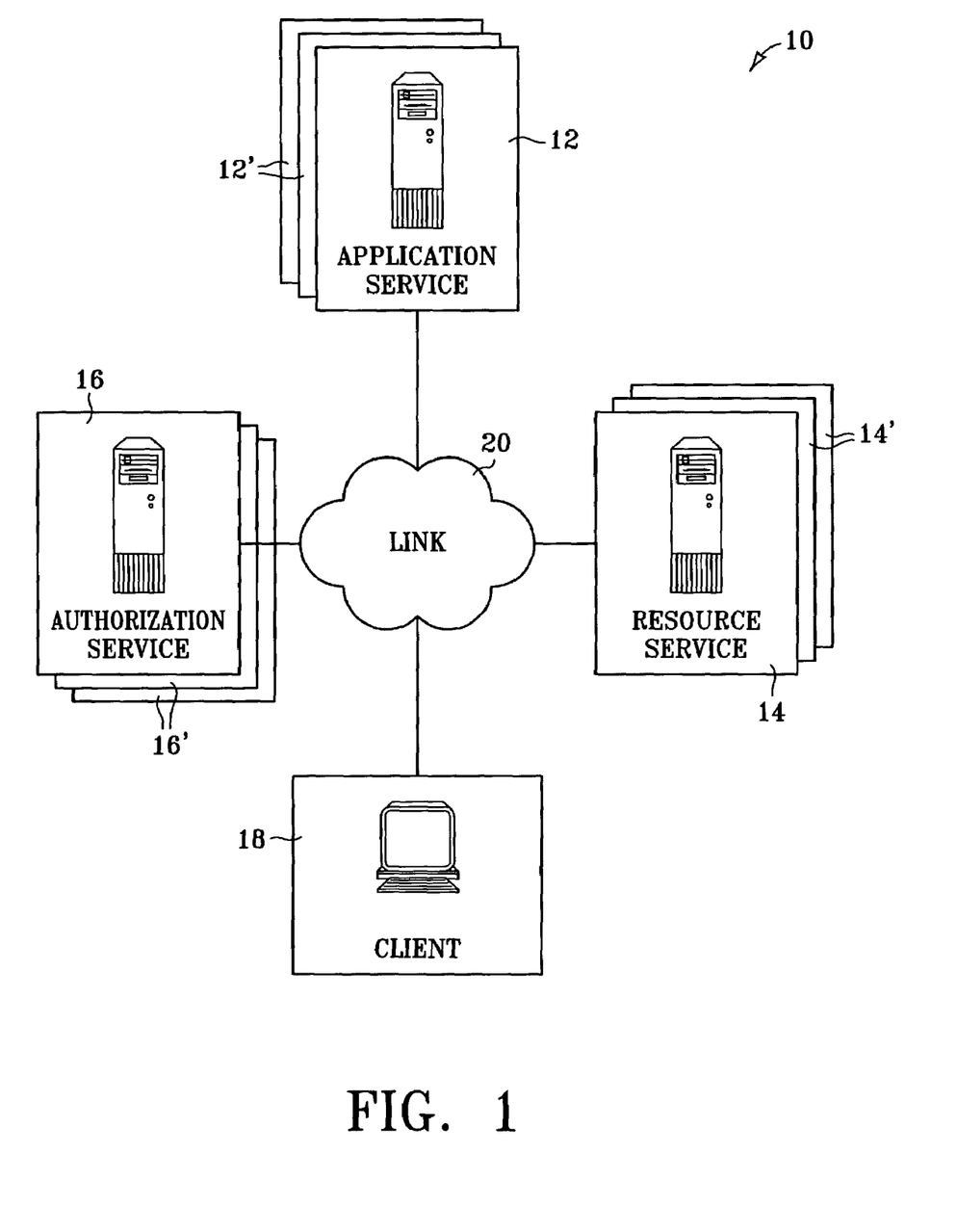
FIG. 1 is a schematic representation of a computer network in which various embodiments of the present invention may be incorporated.

Referring to FIG. 1, computer network 10 represents generally any local or wide area network in which a variety of different electronic devices are linked. Network 10 includes application service 12, resource service 14, authorization service 16, and client 18 all interconnected by link 20. Application service 12 represents generally any combination of programming and/or hardware capable of distributing an application over network 10. Resource service 14 represents any combination of hardware and/or programming capable of providing a resource to a distributed application. Authorization service 16 represents generally any combination of hardware and/or programming capable of authorizing a request to access application service 12 and/or resource service 14. Client 18 represents any combination of hardware and/or programming capable of interacting with application service 12, resource service 14, and authorization service 16. Network 10 may also include one or more additional application services 12', resource services 14', and authorization services 16'.

Link 20 interconnects devices 12-18 and represents generally a cable, wireless, or remote connection via a telecommunication link, an infrared link, a radio frequency link, or any other connector or system that provides electronic communication between devices 12-18. Link 20 may represent an internet, an Internet, or a combination of both. Devices 12-18 can be connected to network 10 at any point and the appropriate communication path established logically between devices 12-18.

Components: The logical components of one embodiment of the invented resource access system will now be described with reference to the block diagram of FIG. 2. Application service 12 includes application 22, application server 24, and resource module 26. Application 22 represents generally any programming capable of being distributed over network 10. For example, application 22 may be a document production service or a remote document management service. Application server 24 represents generally any programming capable of distributing application 22 over network 10. Application server 24 is also capable of generating or otherwise providing an interface or content for an interface to be displayed by client 18 enabling a user to interact with application 22. Resource module 26 represents generally any programming capable of identifying resource service 14.

Figure 2:
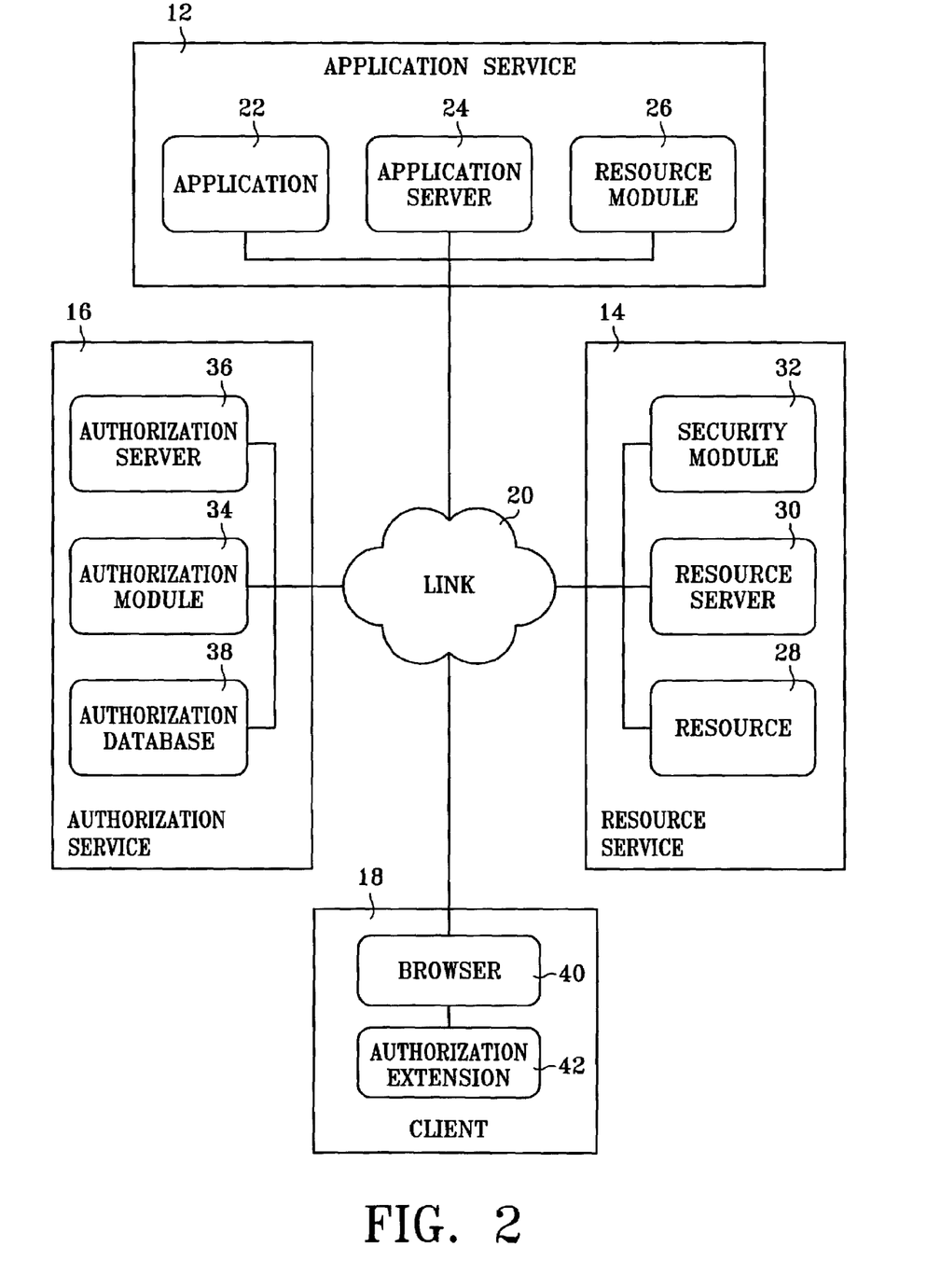
FIG. 2 is a block diagram of the network of FIG. 1 illustrating the logical program components operating on each device according to an embodiment of the present invention.

Resource service 14 includes resource 28, resource server 30, and security module 32. Resource 28 represents generally any programming capable of being accessed and utilized over network 10. For example, where application 22 is a document production service, resource 28 may be a remote document or data management service. Resource server 30 represents any programming capable of making resource 28 available over network 10. Security module 32 represents generally any programming capable of limiting access to resource 28 to those providing authentic credentials.

Authorization service 16 includes authorization module 34, authorization server 36, and authorization database 38. Authorization module 34 represents generally any programming capable of communicating with client 18 and/or resource service 14 to authorize a request to access resource 28. Authorization module 34 is responsible for receiving and acting upon a call from client 18 and/or resource service 14 to authorize a request from or made on behalf of application service 12 to access resource 28. Authorization server 36 represents generally any programming capable of making resource 28 available over network 10. Authorization database 38 represents generally any logical memory to contain data used by authorization module 34.

In this example, servers, 24, 30, and 36 are web servers. Consequently, client 18 includes browser 40. Browser 40 may be a commercially available web browser such as Microsoft's Internet Explorer. The browser may be an integral component of another program such as a word processor that enables the program to interact with servers 24, 30, and 36. Client 18 also includes authorization extension 42 that represents generally any programming capable of identifying and redirecting browser 40 to authorization service 16. An extension is a programming module that adds a specific feature or service to a larger system.

Figure 3:
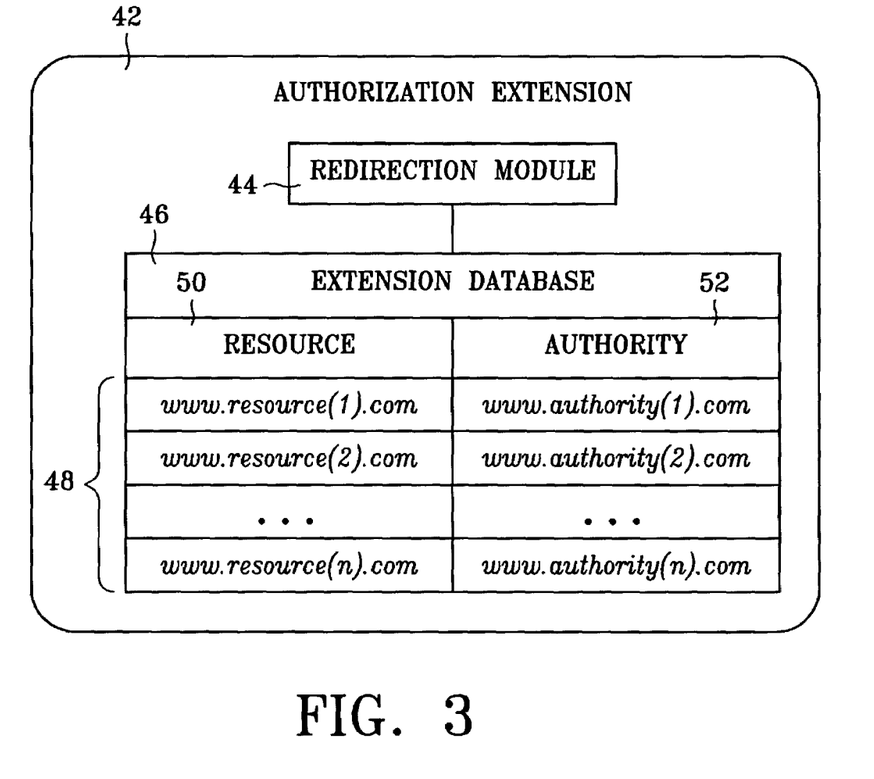
FIG. 3 is a block diagram illustrating the logical components of an authorization extension according to an embodiment of the present invention.

Referring now to FIG. 3, authorization extension 42 includes redirection module 44 and extension database 46. Redirection module 44 represents any programming capable of redirecting browser 40 to authorization service 16. Redirection module 44 identifies authorization service 16 using information retrieved from extension database 46. Extension database 46 contains a number of entries 48. Each entry 48 contains a resource field 50 containing data identifying a particular resource service and an authority field 52 containing data identifying a particular authorization service. The two pieces of data in fields 50 and 52 in each entry 48 are said to be associated with one another. In this example, one entry 48 in extension database 46 should contain data identifying resource service 14 associated with data identifying authorization service 16.

Figure 4:
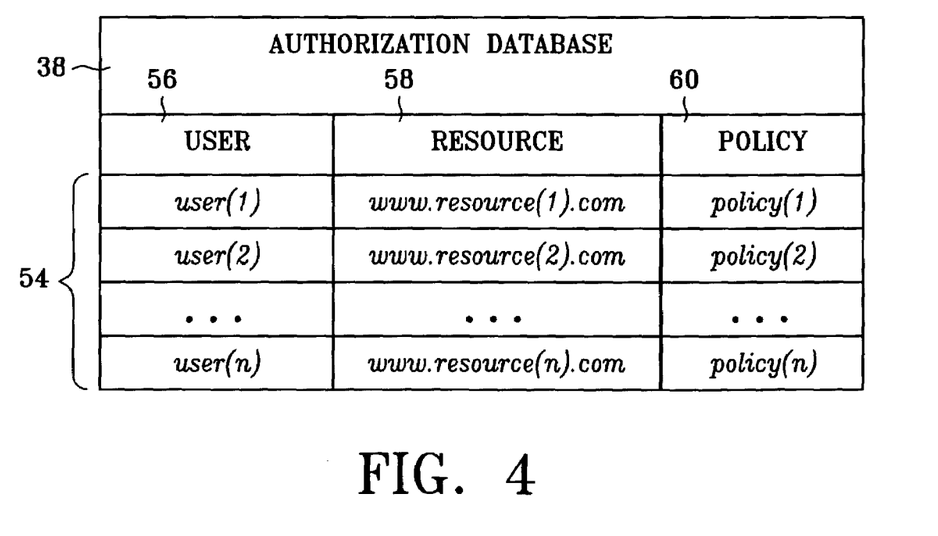
FIG. 4 is a table illustrating the logical elements of an authorization database according to an embodiment of the present invention

Referring now to FIG. 4, authority authorization database 38 includes a number of entries 54 each associated with a particular user. A particular user may, however, be associated with a number of entries 54. Each entry 54 includes user field 56, resource field 58, and policy field 60. The user field 56 for any given entry 54 contains data identifying a particular user. This data may include credentials such as a user name and password or more sophisticated credentials such as biometric information representing, for example, an iris or fingerprint scan. These credentials are used to verify the identity of the user and help to ensure secure access to authorization service 16. The resource field 58 for a given entry 54 contains data identifying a particular resource service 14 or 14'. This data may include credentials needed to fully access the identified resource service 14.

The policy field 60 for a given entry 54 contains policy data used to specify user involvement when authorizing access to a particular resource service 14 identified by resource field 58 in that entry 54. The policy data reflects the level of trust a user has in a particular application service 12. For example, a user may want to personally authorize or deny all requests made of resource service 14 on behalf of application service 12, or the user may trust application service 12 and authorize all such requests. Alternatively, a user may initiate a program session with application service 12 and desire that all requests to access resource service 14 made on behalf of application service 12 be authorized automatically—but only for that session. In this case, the policy data will include session data, such as an alphanumeric string, identifying a current authorized session. The policy field 60 for a given entry may contain policy data relating to any number of application services 12 and 12'. This allows a user to set different trust levels for different application services 12 and 12'.

The block diagrams of FIGS. 2 and 3 and the tables of FIGS. 3 and 4 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programs and data for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, or a portable compact disc.

Figure 5:
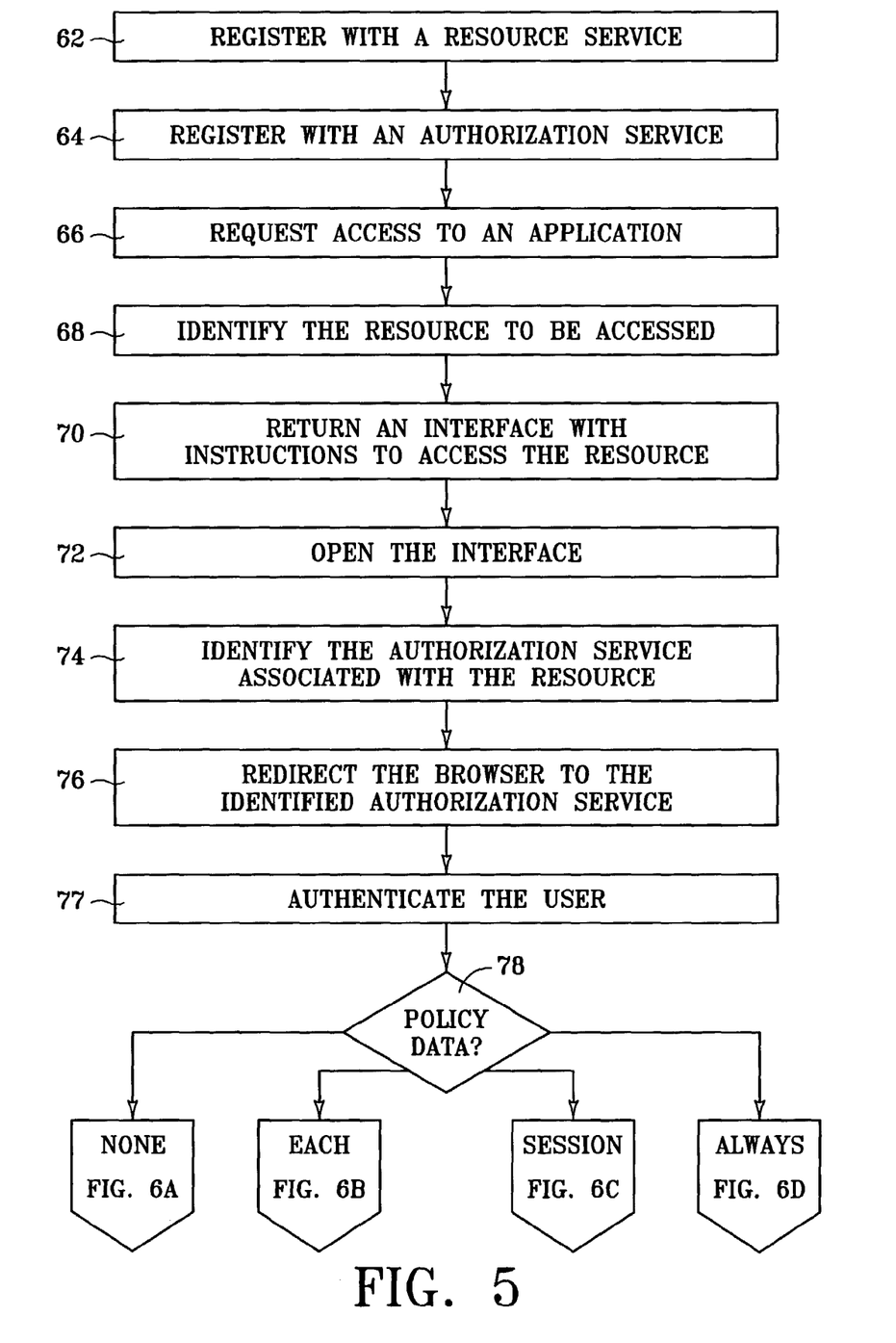
FIGS. 5 and 6A-6D are flow diagrams illustrating steps of a secure resource access method according to an embodiment of the present invention.

Operation: The operation of a resource access method according to one embodiment of the invention will now be described with reference to the flow diagrams of FIG. 5 and FIGS. 6A-6D. FIG. 5 illustrates an example of steps taken to authorize a request to access resource 28. In this example, servers 24, 30, and 36 are web servers.

Initially, a user registers with resource service 14 (step 62). This involves establishing credentials uniquely identifying the user and allowing the user to securely access resource 28. The credentials may be provided by the user or generated by resource service 14. The user also registers with authorization service 16 (step 64). This too involves establishing credentials uniquely identifying the user and allowing the user to securely access authorization service 16. Additionally, the user provides authorization service 16 with data identifying resource service 14 and any policy data if available. Authorization module 34 receives the information and saves it in a new entry 54 in authorization database 38. At the same time authorization redirection module 44 creates a new entry 48 in authorization extension database 46 associating data identifying resource service 14 with authorization service 16.

Where authorization server 36 is a web server, it may provide browser 40 with a cookie identifying the user. A cookie is a message given to a browser by a web server. The browser usually stores the message in a text file. The message, in many cases, is a simple alphanumeric data string unique to the given browser. The message is then sent back to the server each time the browser sends a request to the web server. In this case the cookie's message would be a copy of the data identifying the user located in user field 56 of newly created entry 54 in authorization database 38.

When browser 40 accesses authorization service 16 in the future, authorization server 36 can retrieve the cookie and identify the user.

Through browser 40, the user requests access to application service 12 (step 66). Typically, this involves browsing to a network address established for application 22. Application server 24 receives the request and establishes a new session unless the request is a continuation of an existing session. Resource module 26 identifies the resource service to be accessed—in this case resource service 14 (step 68). Resource server 30 then returns an interface along with session data and instructions to access resource 28 (step 70). Where application server 24 is a web server, it returns a web page containing content instructing browser 40 to access resource 28. The session data may be incorporated into the URL of the web page.

Browser 40 receives and opens the interface (step 72). Authorization extension 42 intercepts the instructions to access resource service 14 and identifies authorization service 16 (step 74). In doing so, redirection module 44 identifies an entry 48 in extension database 46 containing data identifying resource service 14. Using the data identifying authorization service 16 found in the authority field 52 of the located entry 48, redirection module 44 then redirects browser 40 causing it to request access to authorization service 16 (step 76). Browser 40 includes with the request the session data along with data identifying application service 12 and resource service 14. To provide for more secure communication, browser 40 or other programming operating on client 18 may digitally sign the request to access authorization service 16 with credentials in the form of a digital certificate that uniquely identifies the user.

Authorization server 36 then receives and forwards the request to authorization module 34 that authenticates the user (step 77). To do so, authorization module 34 acquires the cookie provided to browser 40 when the user registered in step 64. As described above, the cookie contains data identifying the user as well as data identifying resource service 14. Authorization module 34 locates an entry 54 in authorization database 38 containing a user field 56 with data identifying the user as well as a resource field 58 with data identifying resource service 14.

From the located entry 54, authorization module 34 then obtains and, if it exists, examines policy data for application service 12 (step 78). If none exists, the process continues with FIG. 6A. If the policy data exists and indicates that the user must authorize each request to access resource service 14 made on behalf of application service 12, then the process continues in FIG. 6B. If the policy data indicates that the user has authorized access requests made on behalf of application service 12 for a given session, the process continues in FIG. 6C. If the policy data indicates that the user explicitly trusts and always authorizes access requests made on behalf of application service 12, the process continues in FIG. 6D.

Figure 6A:
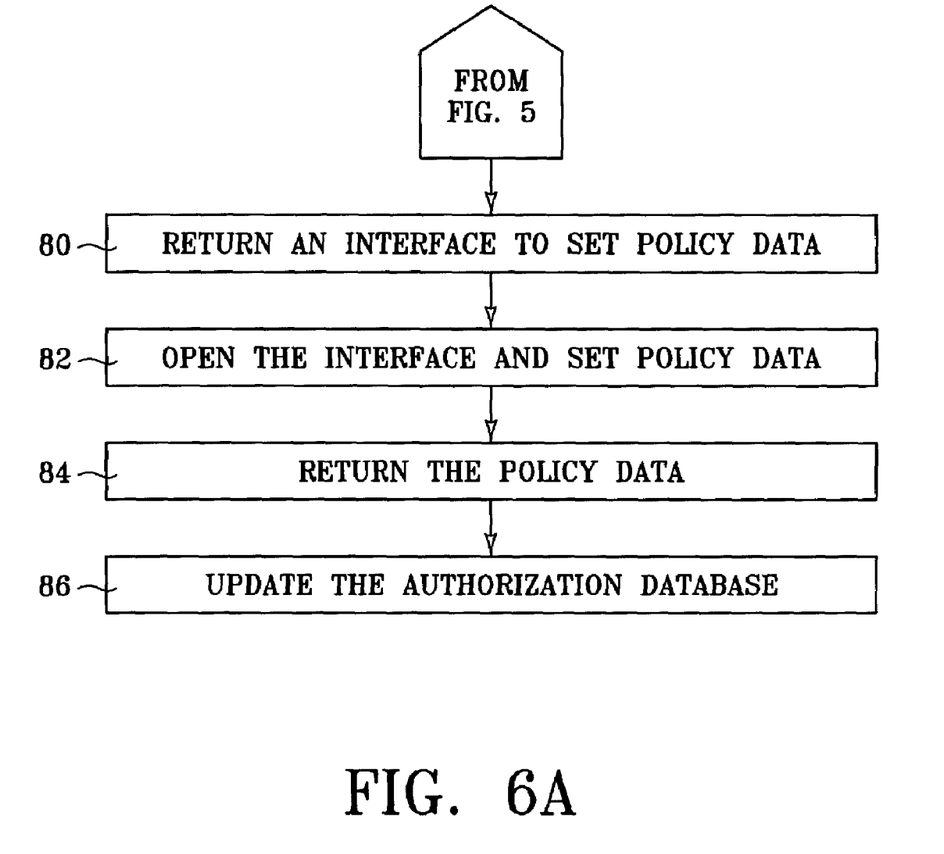

Referring now to FIG. 6A, where no policy data for application service 12 exists in the entry 54 identified in step 78, authorization service 16 returns an interface allowing a user to set policy data for application service 12 (step 80). It is expected that the interface, when displayed by browser 40, will include user accessible controls for setting policy data. Browser 40 opens and displays the interface allowing the user to set the policy data (step 82). Once set, browser 40 returns the policy data to authorization service 16 (step 84). Authorization module 34 then updates authorization database 38 adding the policy data returned in step 84 to the entry 54 located when authenticating the user in step 77. The process then repeats with step 78.

Figure 6B:
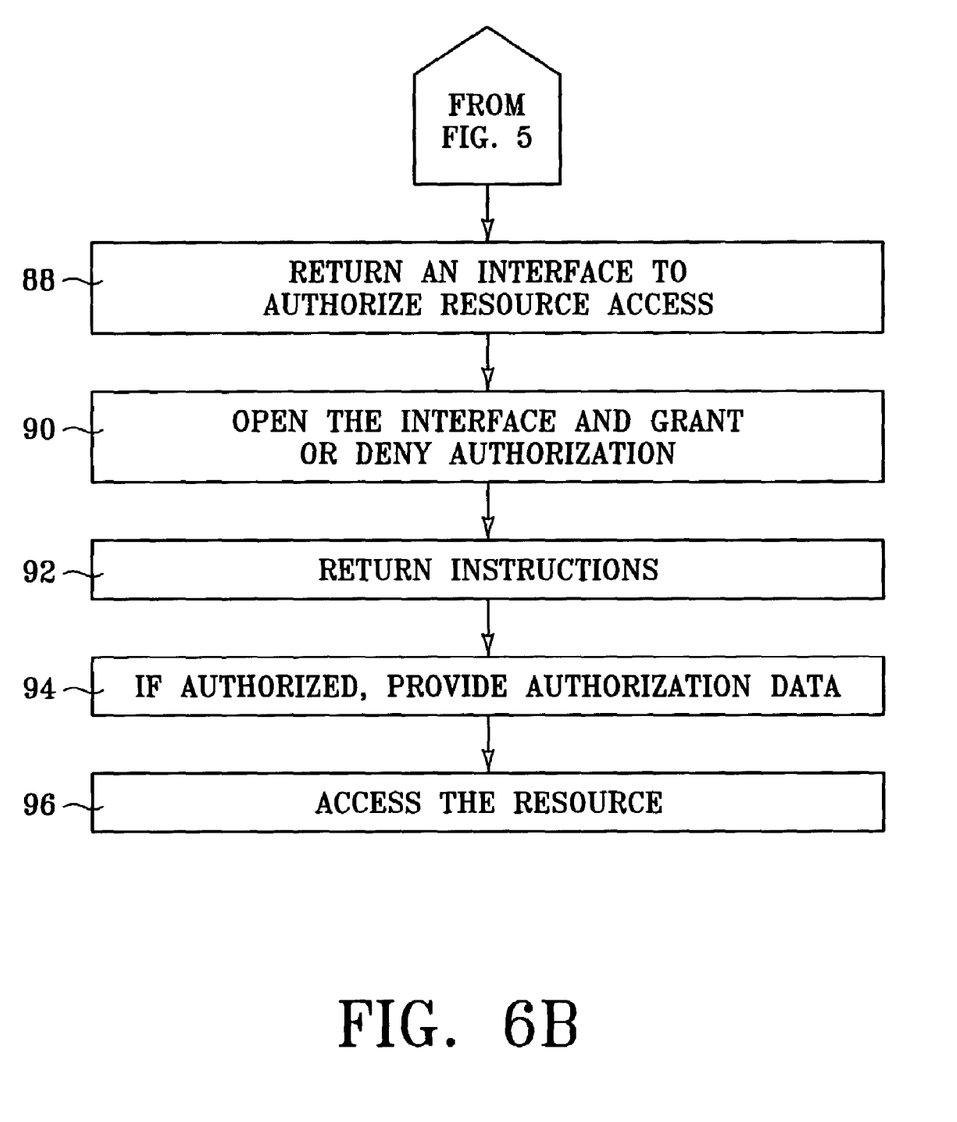

Referring now to FIG. 6B, where the policy data for application service 12 indicates that the user must authorize each request, authorization service 16 returns an interface enabling the user to authorize the request to access resource service 14 (step 88). It is expected that the interface, when displayed, will include data alerting the user that, if authorized, a request to access resource service 14 will be made as well as controls for granting or denying authorization. Browser 40 opens and displays the interface and the user enters instructions either granting or denying authorization (step 90). Browser 40 returns the instructions to authorization service 16 (step 92).

If the instruction grant authorization, authorization module 34 obtains—from entry 54 located in step 77—credentials for accessing resource 28 and bundles those credentials with instructions to access resource service 14. The bundled information is referred to as authorization data and is returned to browser 40 (step 94). On behalf of application 22, browser 40 accesses resource service 14 providing the credentials supplied in step 94 (step 96). Resource server 30 receives the request and directs security module 32 to authenticate the credentials. If authentic, security module 32 grants the request to access resource 28. The process then repeats with step 66.

Figure 6C:
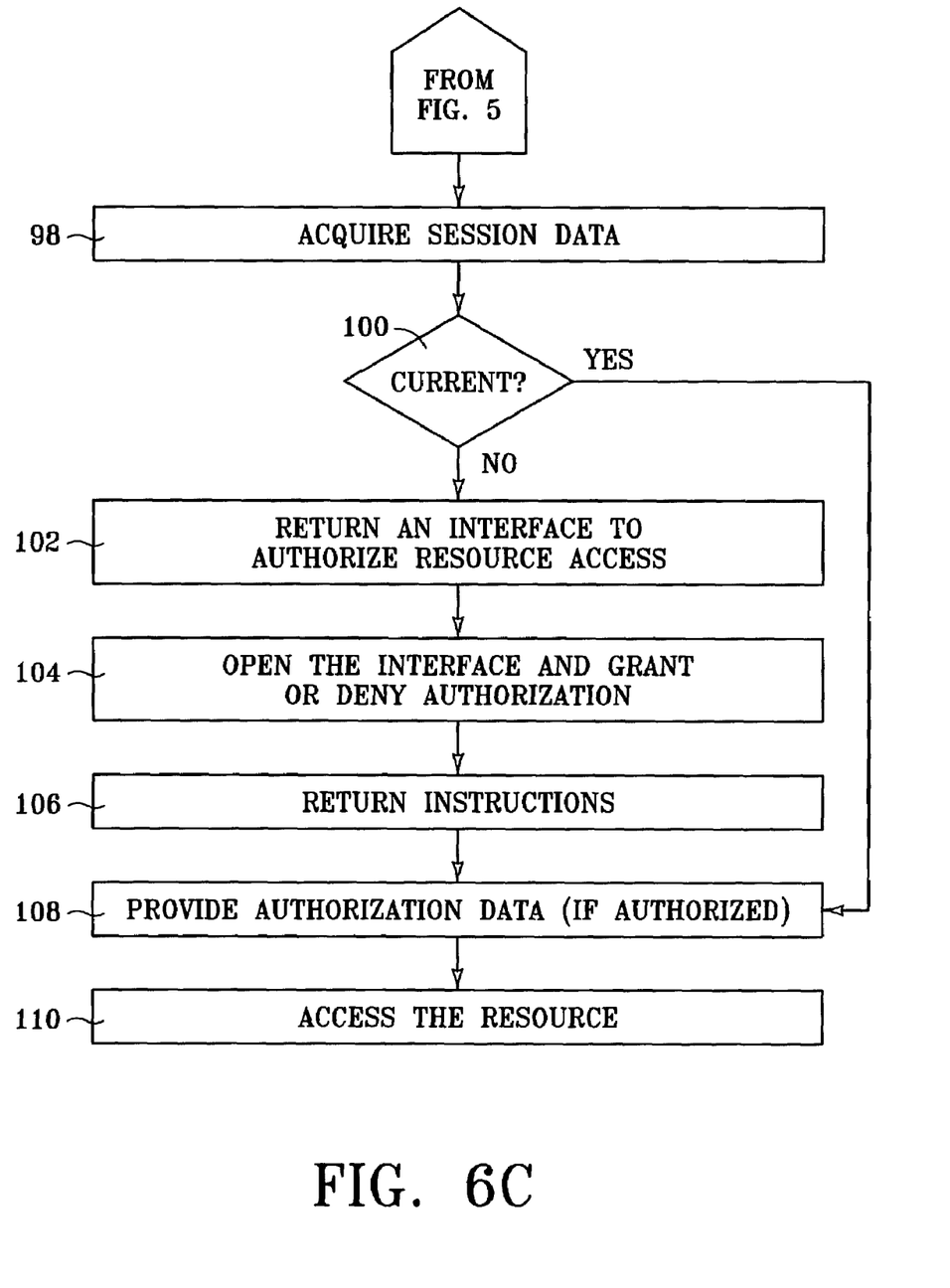

Referring now to FIG. 6C, where the policy data for application service 12 indicates that the user has authorized all requests made on behalf of application service 12 for a given session, authorization module 34 acquires the session data provided in step 76 (step 98). Authorization module 34 determines if the session data is current (step 100). To do so, authorization module 34 obtains the policy data for application service 12 from the entry 54 located in step 77. Only where the policy data includes session data matching the acquired session data is the session data current. If the session data is not current, authorization module 34 returns an interface enabling the user to grant or deny authorization (step 102). It is expected that the interface, when displayed, will include data alerting the user that, if authorized, a request to access resource service 14 will be made as well as controls for granting or denying authorization. Browser 40 opens and displays the interface and the user enters instructions either granting or denying authorization (step 104). Browser 40 returns the instructions to authorization service 16 (step 106).

If the session data is current or the instructions returned in step 106 grant authorization, authorization module 34 obtains—from entry 54 located in step 77—credentials for accessing resource 28 and bundles those credentials with instructions to access resource service 14. The bundled information is referred to as authorization data and is returned to browser 40 (step 108). On behalf of application 22, browser 40 accesses resource service 14 providing the credentials supplied in step 108 (step 110). Resource server 30 receives the request and directs security module 32 to authenticate the credentials. If authentic, security module 32 grants the request to access resource 28. The process then repeats with step 66.

Figure 6D:
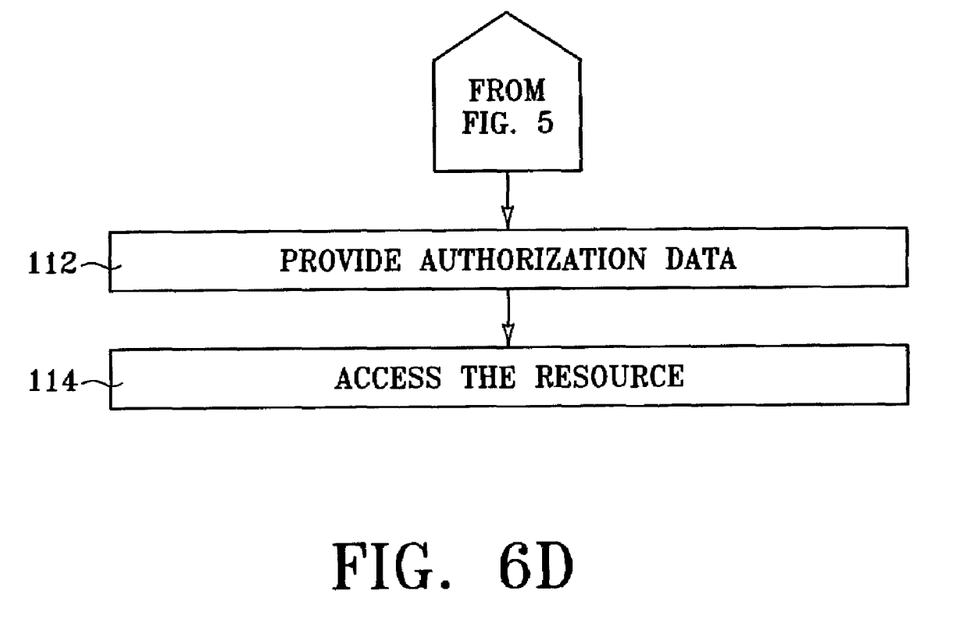

Referring now to FIG. 6D, where the policy data for application service 12 indicates that the user explicitly trusts application service 12 and has authorized all requests made on its behalf, authorization module 34 obtains—from entry 54 located in step 77—credentials for accessing resource 28 and bundles those credentials with instructions to access resource service 14. The bundled information is referred to as authorization data and is returned to browser 40 (step 112). On behalf of application 22, browser 40 accesses resource service providing the credentials supplied in step 112 (step 114). Resource server 30 receives the request and directs security module 32 to authenticate the credentials. If authentic, security module 32 grants the request to access resource 28. The process then repeats with step 66.

Figure 7:
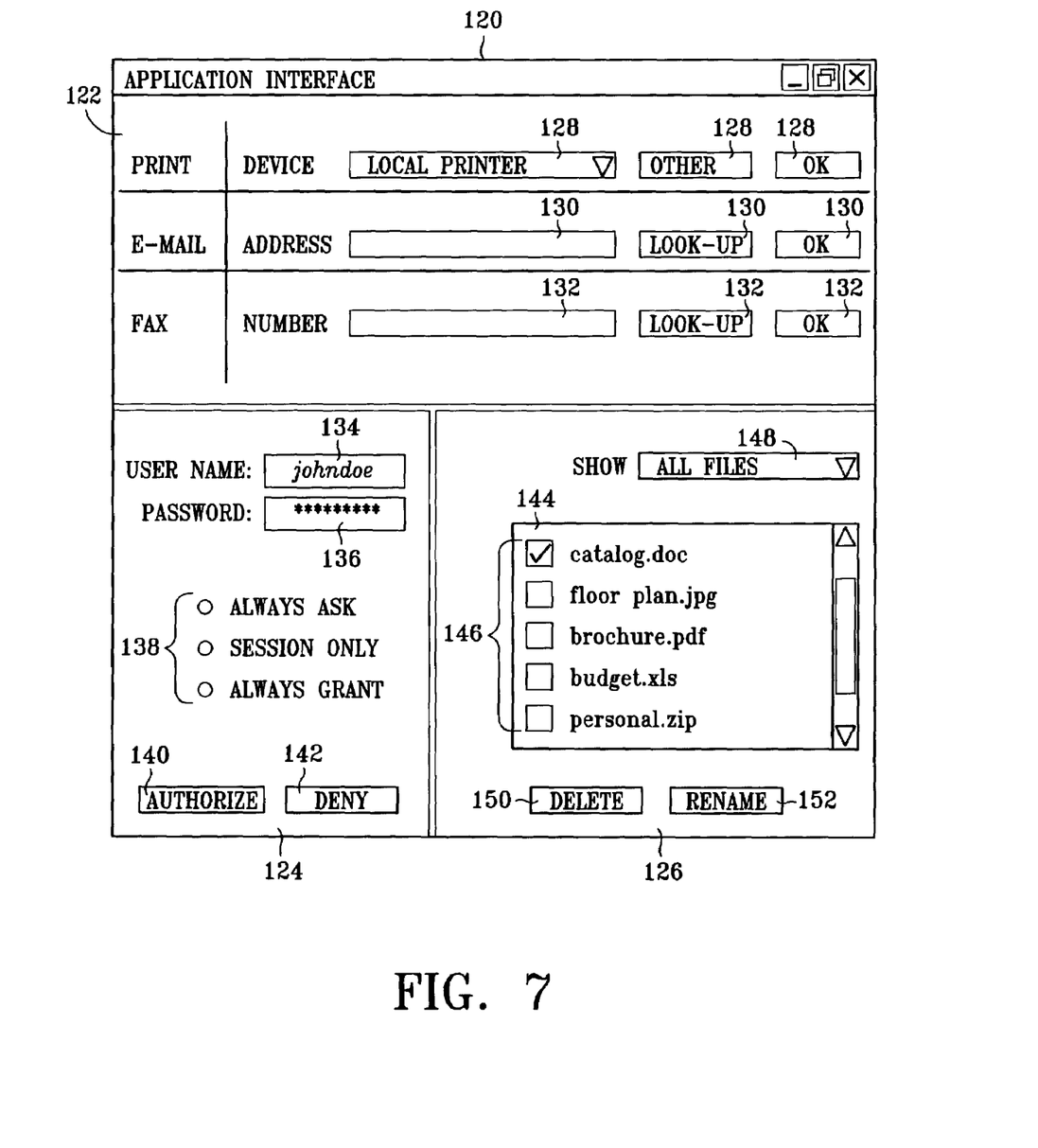
FIG. 7 is an exemplary screen view of an interface enabling a user to interact with a document production service, a document management service, and an authorization service according to an embodiment of the present invention.

FIG. 7 is an exemplary screen view of an interface, in this case a framed web page 120, designed to enable a user to interact, at least indirectly, with application 22, resource 28, and authorization module 34. A framed web page is one that divides the browser's display area into two or more sections or frames. The actual content of each frame is not provided by the framed web page itself. Rather, the framed web page provides, for each frame, a network address for accessing content to be displayed in that frame.

In this example, application 22 is a network resource providing document production services while resource 28 is a network resource providing remote document management. Web page 120 includes first frame 122, second frame 124, and third frame 126. First frame 122 contains controls for interacting with application 22. Second frame 124 contains controls for interacting with authorization service 16. Third frame 126 contains controls for selecting and managing electronic documents managed by resource 28. The content for first frame 122 may be provided to and displayed by browser 40 after opening the interface, in this case framed web page 120, in step 72. The content for second frame 124 is provided after authorization extension redirects browser 40 to authorization service 16 in step 76. Content for the third frame is not provided until resource 28 is accessed in step 96, 110, or 114.

First frame 122 includes controls 128-132 for printing, e-mailing, and faxing a document or documents ultimately selected in third frame 126. Using controls 128, a user can instruct application 22 to print a selected document. Using controls 130 or 132, the user can instruct application 22 to send the selected document to a particular e-mail address or fax the document to a particular number.

Second frame 124 includes controls 134-142. Controls 134 and 136 are text boxes enabling a user to manually provide credentials for accessing authorization service 16. Controls 138 are radio buttons enabling a user to set policy data. Controls 140 and 142 are command buttons enabling a user to grant or deny authorization to access resource service 14.

Third frame 126 includes a scroll menu 144 displaying electronic documents managed by resource 28. In this example, scroll menu 144 includes check boxes 146 allowing the user to select one or more of the displayed documents. Here, the document "catalog.doc" has been selected. Also included is pull down menu 148 and command buttons 150 and 152. Pull down menu 148 allows a user to select the type of files displayed in scroll menu 144. In this example "all files" is selected. A user may, however, desire to show, for example, only word processor documents or spreadsheets. Command buttons 150 and 152 allow a user to perform tasks such as deleting or renaming documents selected in scroll menu 144.

Although the flow charts of FIGS. 5 and 6A-6D show a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention. The screen display of FIG. 7 is exemplary only. There exist many possible layout and control configurations for interfaces that will allow a user to interact with application service 12, resource service 14, and authorization service 16. FIG. 7 merely provides one such example.

Conclusion: Beneficially, different authorization services 16 and 16' may be provided to enable access on behalf of one or more application services 12 and 12' to any number of resource services 14 and 14'. Authorization service 16 can be completely autonomous and decentralized from application service 12 and resource service 14. In fact, application service 12 and resource service 14 need not have any knowledge of authorization service 16. This provides an added layer of security. Where an unscrupulous third party breaks into application service 12 or resource service 14, that party will not be able to locate the users data held by authorization services 16 or 16'. Moreover, it is expected that this decentralized approach will help to alleviate network communication bottlenecks that occur with a centralized authorization service.

The present invention has been shown and described with reference to the foregoing exemplary embodiments. It is to be understood, however, that other forms, details, and embodiments may be made without departing from the spirit and scope of the invention that is defined in the following claims.

What is claimed is:

1. In a computer network, an access authorization method, comprising:

receiving a request from a client, acting on behalf of a first resource, to access a second resource;

before accessing the second resource, using client programming that is autonomous of the first and second resources to redirect the client to an authorization service that is also autonomous of the first and second resources; and the authorization service authenticating a user, identifying policy data for the first resource, if any, and returning to the client an interface generated according to the identified policy data, if any, enabling the user to grant or deny authorization.

2. The method of claim 1, wherein redirecting the client causes the client to request access to the authorization service, the method further comprising digitally signing the request with credentials needed to authenticate the user.

3. The method of claim 1, wherein data identifying the authorization service is associated with data identifying the second resource, the method further comprising the client programming acquiring and using data identifying the second resource to identify the authorization service.

4. The method of claim 1, where the user grants authorization through the returned interface, the method further comprising the authorization service acquiring credentials needed to access the second resource and providing the client with the credentials and instructions to access the second resource using the credentials.

5. The method of claim 1, further comprising registering with the authorization service providing data identifying the user, data identifying the second resource, and policy data for the first resource.

6. The method of claim 1, where the authorization service is unable to acquire policy data for the first resource, the method further comprising returning to the client an interface enabling the user to set policy data for the first resource.

7. The method of claim 1, where the acquired policy data indicates that the user must grant or deny authorization for each access made of the second resource, and wherein returning an interface comprises returning an interface having user accessible controls enabling the user to grant or deny authorization, and where the user grants authorization, the method further comprising acquiring credentials needed to access the second resource and providing the client with the credentials and instructions to access the second resource using the credentials.

8. The method of claim 1, where the acquired policy data indicates that the user grants authorization for a current session, the method further comprising providing the authorization service with session data for the first resource, and determining whether the session data is current;
if the session data is current acquiring credentials needed to access the second resource and providing the client with the credentials and instructions to access the second resource using the credentials; and
if the session data is new and not current, returning to the client an interface enabling the user to grant or deny authorization for the new session, and if the user grants authorization for the new session, acquiring credentials needed to access the second resource and providing the client with the credentials and instructions to access the second resource using the credentials.

9. The method of claim 1, where the acquired policy data indicates the user always grants authorization, the method further comprising acquiring credentials needed to access the second resource and providing the client with the credentials and instructions to access the second resource using the credentials.

10. In a computer network, a method for enabling a user to authorize a client acting on behalf of a first resource to access a second resource, comprising:
before accessing the second resource, using client programming that is autonomous of the first and second resources to redirect the client to an authorization service that is also autonomous of the first and second resources;
the authorization service authenticating the user, acquiring policy data for the first resource, if any; and
where no policy data exists, returning to the client an interface enabling the user to set policy data for the first resource;
where the acquired policy data indicates that the user must grant or deny authorization for each access made of the second resource, returning an interface enabling the user to grant or deny authorization; and
where the acquired policy data indicates that the user grants authorization for a current session, providing the authorization service with session data for the first resource, and determining whether the session data is current, and, if the session data is new and not current, returning to the client an interface enabling the user to grant or deny authorization for the new session.

11. The method of claim 10, wherein redirecting the client causes the client to request access to the authorization service, the method further comprising digitally signing the request with credentials needed to authenticate the user.

12. The method of claim 10, wherein data identifying the authorization service is associated with data identifying the second resource, the method further comprising the client programming acquiring and using data identifying the second resource to identify the authorization service.

13. The method of claim 10, where, according to the acquired policy data or through a returned interface, the user grants authorization, the method further comprising the authorization service acquiring credentials needed to access the second resource and providing the client with the credentials and instructions to access the second resource using the credentials.

14. In a computer network, an access authorization method, comprising:
receiving from a client a request to access a first resource;
returning to the client interface content having instructions to access a second resource;
using client programming that is autonomous of the first and second resources to redirect the client to an authorization service that is also autonomous of the first and second resources; and
the authorization service authenticating the user, identifying policy data for the first resource, if any, and returning to the client an interface generated according to the identified policy data, if any, enabling the user to grant or deny authorization for the instructions to access the second resource.

15. The method of claim 14, wherein redirecting the client causes the client to request access to the authorization service, the method further comprising digitally signing the request with credentials needed to authenticate the user.

16. The method of claim 14, wherein data identifying the authorization service is associated with data identifying the second resource, the method further comprising the client programming acquiring and using data identifying the second resource to identifying the authorization service.

17. The method of claim 14, where, according to the acquired policy data or through a returned interface, the user grants authorization, the method further comprising the authorization service acquiring credentials needed to access the second resource and providing the client with the credentials and instructions to access the second resource using the credentials.

18. A computer readable medium having instructions for:
intercepting instructions from content provided to a client by a first resource that direct the client to access a second resource;
identifying an authorization service that is autonomous from the first and second resources; and
redirecting the client to the identified authorization service.

19. The medium of claim 18, wherein the instructions for redirecting the client cause the client to request access to the identified authorization service, the medium having further instructions for digitally signing the request with credentials needed to authenticate a user with the identified authorization service.

20. The medium of claim 18, having further instructions for displaying an interface having user accessible controls for granting or denying authorization for accessing the second resource and returning to the identified authorization service instructions provided by a user through the returned interface.

21. A computer readable medium, having instructions for:
receiving an access request from a client the request including data identifying a first resource;
acquiring policy data for the first resource, if it exists;
returning to the client an interface generated according to the identified policy data, if any, enabling the user to grant or deny authorization for a request made by or on behalf of the first resource to access a second resource.

22. The medium of claim 21, having further instructions for acquiring and authenticating data identifying a user before acquiring the policy data.

23. The medium of claim 21, having further instructions for returning to the client an interface enabling the user to set policy data for the first resource.

24. The medium of claim 21, where the acquired policy data indicates that the user must grant or deny authorization for each access made of the second resource, and wherein the instructions for returning an interface comprise instructions for returning an interface having user accessible controls enabling the user to grant or deny authorization, and where the user grants authorization, the medium having further instructions for acquiring credentials needed to access the second resource and providing the client with the credentials and instructions to access the second resource using the credentials.

25. The medium of claim 21, where the acquired policy data indicates that the user grants authorization for a current session, the medium having further instructions for:
   acquiring session data for the first resource;
   determining whether the session data is current;
   if the session data is current acquiring credentials needed to access the second resource and providing the client with the credentials and instructions to access the second resource using the credentials; and
   if the session data is new and not current, returning to the client an interface enabling the user to grant or deny authorization for the new session, and then, if the user grants authorization for the new session, acquiring credentials needed to access the second resource and providing the client with the credentials and instructions to access the second resource using the credentials.

26. The medium of claim 21, where the acquired policy data indicates the user always grants authorization, the medium having further instructions for acquiring credentials needed to access the second resource and providing the client with the credentials and instructions to access the second resource using the credentials.

27. Programming for enabling a user to authorize a client acting on behalf of a first resource to access a second resource, the programming embodied in a computer readable medium having instructions for:
   intercepting instructions from interface content provided to a client by the first resource that direct the client to access the second resource;
   identifying an authorization service that is autonomous from the first and second resources;
   redirecting the client to the identified authorization service;
   acquiring session data, data identifying the user, and data identifying the first resource;
   authenticating the data identifying the user
   acquiring policy data, if any, for the first resource; and
   where no policy data exists, returning to the client an interface enabling the user to set policy data;
   where the acquired policy data indicates that the user must grant or deny authorization for each access made of the second resource, returning to the client an interface enabling the user to grant or deny authorization; and
   where the acquired policy data indicates that the user grants authorization for a current session, determining whether the acquired session data is current if the session data is new and not current, returning to the client an interface enabling the user to grant or deny authorization for the new session.

28. The programming of claim 27, wherein the instructions for redirecting the client, when executed, cause the client to request access to the authorization service, wherein the medium includes further instructions for digitally signing the request with credentials needed to authenticate the user.

29. The programming of claim 27, where, according to the acquired policy data or through a returned interface, the user grants authorization, wherein the medium includes further instructions for acquiring credentials needed to access the second resource and providing the client with the credentials and instructions to access the second resource using those credentials.

30. A computer readable medium having instructions for receiving from a client a request to access a first resource;
   returning to the client interface content having instructions to access a second resource;
   redirecting the client to an authorization service that is autonomous of the first and second resources;
   providing the authorization service with data identifying the first resource; and
   identifying policy data, if any, for the first resource and returning to the client an interface generated according to the identified policy data, if any, enabling the user to grant or deny authorization for the instructions to access the second resource.

31. The medium of claim 30, wherein the instructions for redirecting the client, when executed, cause the client to request access to the authorization service, the medium having further instructions for digitally signing the request with credentials needed to authenticate the user and authorizing the credentials before acquiring the policy data.

32. The medium of claim 30, wherein data identifying the authorization service is associated with data identifying the second resource, the medium having further instructions for acquiring and using data identifying the second resource to identify the authorization service.

33. The medium of claim 30, the medium having further instructions, where, according to the acquired policy data or through a returned interface, the user grants authorization, for acquiring credentials needed to access the second resource and providing the client with the credentials and instructions to access the second resource using the credentials.

34. In a computer network, a system for enabling a user to authorize a client, acting on behalf of a first resource, to access a second resource, the system comprising an authorization extension and an authorization service each autonomous from the first and second resources;
   the authorization extension operable to:
      intercept instructions from content provided to the client by the first resource that direct the client to access the second resource;
      identify the authorization service; and
      redirect the client to the authorization service; and
   the authorization service operable to:
      acquire data identifying the user, data identifying the first resource, arid data identifying the second resource;
      acquire policy data, if any, for the first resource; and
      return to the client an interface generated according to the policy data, if any, enabling the user to grant or deny authorization for the instructions to access the second resource.

35. The system of claim 34, wherein redirecting the client causes the client to request access to the authorization service, the system further comprising programming operable to digitally sign the request with credentials needed to authenticate the user, and wherein the authorization service is further operable to authenticate the user using the credentials.

36. The system of claim 34, where, according to the acquired policy data or through a returned interface, the user grants authorization, wherein the authorization service is further operable to acquire credentials needed to access the second resource and provide the client with the credentials and instructions to access the second resource using the credentials.

37. In a computer network, a system for enabling a user to authorize a client, acting on behalf of a first resource, to access a second resource, the system comprising:
- a means for intercepting instructions from content provided to a client by the first resource that direct the client to access the second resource;
- a means for identifying an authorization service that is autonomous from the first and second resources;
- a means for redirecting the client to the identified authorization service;
- a means for acquiring session data and identifying the user
- a means for authenticating the data identifying the user
- a means for acquiring policy data, if any, for the first resource; and
- a means for returning to the client an interface, generated according to the acquired policy data, enabling the user to grant or deny authorization.

38. The system of claim 37, wherein the means for redirecting the client causes the client to request access to an authorization service autonomous from the first and second resources, the system further comprising a means for digitally signing the request with credentials needed to authenticate the user.

39. The system of claim 37, where, according to acquired policy data or through a returned interface, the user grants authorization, the system further comprising a means for acquiring credentials needed to access the second resource and a means for providing the client with the credentials and instructions to access the second resource using those credentials.

* * * * *

UNITED STATES PATENT AND TRADEMARK OFFICE
CERTIFICATE OF CORRECTION

PATENT NO. : 7,373,662 B2  Page 1 of 1
APPLICATION NO. : 10/229641
DATED : May 13, 2008
INVENTOR(S) : Ward Scott Foster et al.

It is certified that error appears in the above-identified patent and that said Letters Patent is hereby corrected as shown below:

On the title page, item (57), under "Abstract", in column 2, line 2, delete "directed" and insert -- direction --, therefor.

In column 4, line 40, delete "internet" and insert -- intranet --, therefor.

In column 11, line 11, in Claim 8, after "current" insert -- , --.

In column 12, line 53, in Claim 21, after "client" insert -- , --.

In column 13, line 15, in Claim 25, after "current" insert -- , --.

In column 13, line 56, in Claim 27, after "current" insert -- , --.

In column 14, line 6, in Claim 30, after "for" insert -- : --.

In column 14, line 50, in Claim 34, delete "arid" and insert -- and --, therefor.

Signed and Sealed this

Fifth Day of May, 2009

JOHN DOLL
*Acting Director of the United States Patent and Trademark Office*